United States Patent
Khalid et al.

(10) Patent No.: US 12,088,558 B2
(45) Date of Patent: Sep. 10, 2024

(54) METHOD AND APPARATUS FOR AUTOMATICALLY SWITCHING BETWEEN VIRTUAL PRIVATE NETWORKS

(71) Applicant: Charter Communications Operating, LLC, St. Louis, MO (US)

(72) Inventors: Saran Khalid, Denver, CO (US); Mohammedyusuf M. Shaikh, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 430 days.

(21) Appl. No.: 17/361,766

(22) Filed: Jun. 29, 2021

(65) Prior Publication Data

US 2022/0417217 A1 Dec. 29, 2022

(51) Int. Cl.
*H04L 29/00* (2006.01)
*H04L 9/40* (2022.01)

(52) U.S. Cl.
CPC ........ *H04L 63/0272* (2013.01); *H04L 63/083* (2013.01); *H04L 63/102* (2013.01); *H04L 63/20* (2013.01)

(58) Field of Classification Search
CPC . H04L 63/0272; H04L 63/083; H04L 63/102; H04L 63/20
See application file for complete search history.

(56) References Cited

U.S. PATENT DOCUMENTS 8,955,076 B1 * 2/2015 Faibish ............... H04L 63/0853 726/7
9,077,686 B2 7/2015 Kumar et al.
10,216,943 B2 * 2/2019 Krishna ................. H04L 63/10
(Continued)

OTHER PUBLICATIONS

Microsoft, "VPN auto-triggered profile options", Windows 10—Microsoft 365 Security, Jul. 27, 2017, pp. 1-4, https://docs.microsoft.com/en-us/windows/security/identity-protection/vpn/vpn-auto-trigger-profile.

(Continued)

*Primary Examiner* — Don G Zhao
(74) *Attorney, Agent, or Firm* — Young Basile Hanlon & MacFarlane, P.C.

(57) ABSTRACT

Disclosed herein are methods and apparatus for automatically switching virtual private networks. A method includes automatically detecting, by a switching virtual private network application, activation of an application, automatically determining, by the switching virtual private network application, whether the application is a defined application in the switching virtual private network application, wherein each defined application includes an associated virtual private network which is needed for a user device to access the application, automatically disconnecting, by the switching virtual private network application, a different virtual private network when the application is defined in the switching virtual private network application, automatically initiating, by the switching virtual private network application, a connection with a virtual private network associated with the application when the application is defined in the switching virtual private network application, and automatically establishing a virtual private network for the application upon acceptance of credentials associated with the virtual private network.

13 Claims, 7 Drawing Sheets

(56) References Cited

U.S. PATENT DOCUMENTS

| | | | | |
|---|---|---|---|---|
| 10,778,668 | B2* | 9/2020 | Bhattacharya | H04L 63/083 |
| 11,677,679 | B2* | 6/2023 | Bantke | H04L 67/1001 |
| | | | | 709/226 |
| 2003/0084165 | A1* | 5/2003 | Kjellberg | H04L 67/1095 |
| | | | | 709/227 |
| 2003/0154406 | A1* | 8/2003 | Honarvar | G07C 9/37 |
| | | | | 713/153 |
| 2007/0111708 | A1* | 5/2007 | Dorenbosch | H04W 12/069 |
| | | | | 455/411 |
| 2008/0026724 | A1* | 1/2008 | Zhang | H04W 12/06 |
| | | | | 455/411 |
| 2008/0189212 | A1* | 8/2008 | Kulakowski | G06Q 30/018 |
| | | | | 705/50 |
| 2011/0004926 | A1* | 1/2011 | O'Donnell, III | H04L 9/3271 |
| | | | | 726/3 |
| 2011/0107090 | A1* | 5/2011 | Varadarajan | H04L 9/3297 |
| | | | | 713/158 |
| 2015/0149350 | A1* | 5/2015 | Ananda Kumar | G06Q 20/14 |
| | | | | 705/40 |
| 2015/0271557 | A1* | 9/2015 | Tabe | H04N 21/6131 |
| | | | | 725/62 |
| 2016/0044723 | A1* | 2/2016 | Sergeev | H04W 76/12 |
| | | | | 370/252 |
| 2016/0088092 | A1* | 3/2016 | Cardona-Gonzalez | |
| | | | | H04L 67/141 |
| | | | | 709/227 |
| 2016/0105414 | A1* | 4/2016 | Bringer | H04L 9/3247 |
| | | | | 713/168 |
| 2016/0226908 | A1* | 8/2016 | McGeehan | H04L 63/1491 |
| 2016/0335637 | A1* | 11/2016 | Deshpande | H04W 4/14 |
| 2017/0103194 | A1* | 4/2017 | Wechsler | G06F 21/316 |
| 2017/0289134 | A1* | 10/2017 | Bradley | H04L 63/105 |
| 2018/0007066 | A1* | 1/2018 | Goutal | H04L 63/1483 |
| 2018/0014340 | A1* | 1/2018 | Hill | H04L 12/4633 |
| 2018/0077199 | A1* | 3/2018 | Tsao | G06F 21/44 |
| 2018/0115547 | A1* | 4/2018 | Peterson | H04L 63/029 |
| 2018/0302226 | A1* | 10/2018 | Heimlicher | H04L 63/061 |
| 2019/0028368 | A1* | 1/2019 | Modi | H04L 41/0816 |
| 2019/0147416 | A1* | 5/2019 | Rule | G06Q 20/0855 |
| | | | | 705/39 |
| 2019/0266589 | A1* | 8/2019 | Tiwaree | G06Q 20/322 |
| 2019/0334921 | A1* | 10/2019 | Pattar | H04L 9/3271 |
| 2020/0053120 | A1* | 2/2020 | Wilcox | G06F 40/205 |
| 2020/0112526 | A1* | 4/2020 | Moon | G06N 3/006 |
| 2020/0344213 | A1* | 10/2020 | Gorsica, IV | G06F 21/606 |
| 2021/0019755 | A1* | 1/2021 | Omojola | G06Q 20/12 |
| 2021/0044976 | A1* | 2/2021 | Avetisov | H04L 63/0815 |
| 2021/0058395 | A1* | 2/2021 | Jakobsson | H04L 67/306 |
| 2021/0099484 | A1* | 4/2021 | Li | G06F 16/2255 |
| 2021/0134110 | A1* | 5/2021 | Irwin, Jr. | H04L 9/3263 |
| 2021/0160281 | A1* | 5/2021 | Hallaji | G06N 20/00 |
| 2021/0273913 | A1* | 9/2021 | Bosch | H04L 63/0815 |
| 2022/0116374 | A1* | 4/2022 | Nair | H04L 63/08 |
| 2022/0171825 | A1* | 6/2022 | Brannon | G06F 21/6245 |
| 2022/0279019 | A1* | 9/2022 | Kras | H04L 63/1483 |
| 2022/0400100 | A1* | 12/2022 | Oakley | H04L 63/0272 |
| 2022/0414866 | A1* | 12/2022 | Price | G06N 3/045 |

OTHER PUBLICATIONS

QNAP Systems, Inc., "VPN Client", QNAP Turbo NAS Software User Manual, Jun. 25, 2021, pp. 1-2, https://docs.qnap.com/nas-outdated/4.2/SMB/en/index.html?vpn_client.htm.

Palo Alto Networks, "How to easily switch between multiple GlobalProtect VPN profiles??? ", LIVEcommunity, Jun. 25, 2021, pp. 1-5, https://live.paloaltonetworks.com/t5/general-topics/how-to-easily-switch-between-multiple-globalprotect-vpn-profiles/td-p/199445.

Boofis Software, "Global Protect Switcher 1.0 Full Version", Jun. 25, 2021, pp. 1-3, https://boofis.com/product/global-protect-switcher-1-0/.

* cited by examiner

METHOD AND APPARATUS FOR AUTOMATICALLY SWITCHING BETWEEN VIRTUAL PRIVATE NETWORKS

TECHNICAL FIELD

This disclosure relates to networks. More specifically, this disclosure relates to using virtual private networks.

BACKGROUND

Computing and data resources, such as services, workstations, and servers, at corporations are generally located across multiple geographic locations. Access to these resources may be controlled using different network security and access policies. Virtual private networks (VPNs) may be used to securely access these resources. A VPN is a form of encrypted connection or communication link over the Internet from a device to a target network associated with the computing and data resource. That is, VPNs provide secure remote access to the computing and data resource. Different computing and data resource may have different or separate VPNs. A problem with VPNs is that only one VPN connection is permitted at a time in accordance with network policy. A user must switch from one VPN to another VPN in order to access and work on different servers, workstations, and resources. Switching between different VPNs is time consuming, tedious, and inconvenient.

SUMMARY

Disclosed herein are methods and apparatus for automatically switching virtual private networks.

In implementations, a method for automatically switching between virtual private networks includes automatically detecting, by a switching virtual private network application, activation of an application, automatically determining, by the switching virtual private network application, whether the application is a defined application in the switching virtual private network application, wherein each defined application includes an associated virtual private network which is needed for a user device to access the application, automatically disconnecting, by the switching virtual private network application, a different virtual private network when the application is defined in the switching virtual private network application, automatically initiating, by the switching virtual private network application, a connection with a virtual private network associated with the application when the application is defined in the switching virtual private network application, and automatically establishing a virtual private network for the application upon acceptance of credentials associated with the virtual private network.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
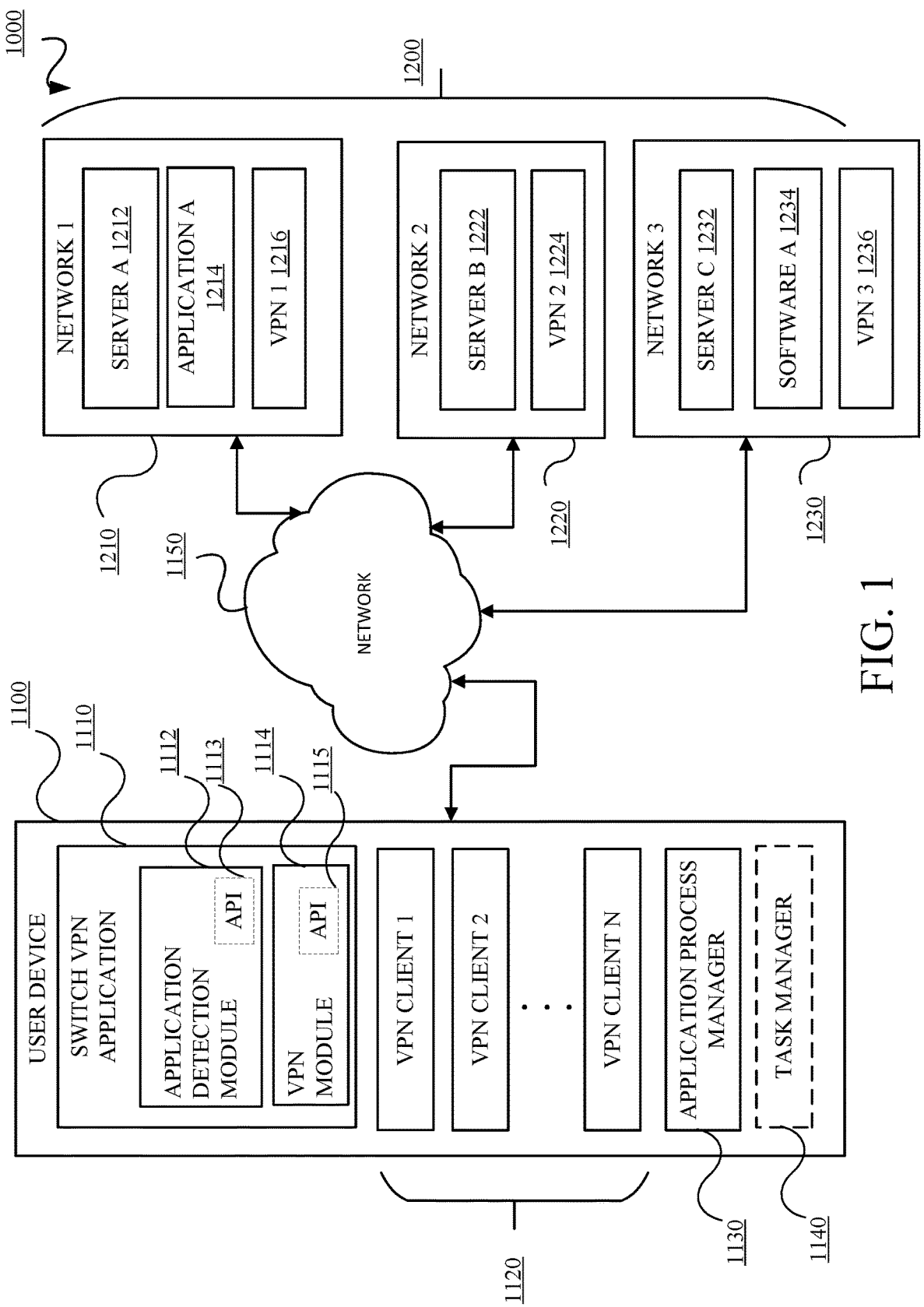
FIG. 1 is a diagram of an example system in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, executable software, application or similar construct which is stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, VPN switching, telephony, web browsers, e-commerce transactions, media players, streaming, Internet Protocol (IP) video, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example system 1000 in accordance with embodiments of this disclosure. The system 1000 can include a user device 1100 connected to or in communication with (collectively "connected to") a service provider system 1200 via a network 1150. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The user device 1100 may be, but is not limited to, end user devices, cellular telephones, Internet Protocol (IP) devices, mobile computers, laptops, handheld computers, smartphones, notebooks, notepads, desktops, computer, computing device, and the like. The user device 1100 may include a switch VPN application 1110, one or more VPN clients 1, 2, . . . , N 1120, and an application process manager 1130. In implementations, the user device 1100 may include a task manager 1140.

The switch VPN application 1110 is a program stored in memory or storage on the user device 1100 and executed by a processor as described herein. The switch VPN application 1110 may run as a background program on the user device 1110. The switch VPN application 1110 may include an application detection module 1112 and a VPN module 1114. In implementations, the application detection module 1112 may include application program interfaces (APIs) 1113 for interfacing with VPN requiring connectable entities such as applications, servers, services, and software, for example. In implementations, the VPN module 1114 may include APIs 1115 for interfacing with the one or more VPN clients 1, 2, . . . , N 1120. The switch VPN application 1110 may maintain a list of VPN requiring connectable entities and the associated VPNs for accessing the connectable entities.

The one or more VPN clients 1, 2, . . . , N 1120 provides and establishes a secure connection between the user device 1100 and an associated VPN server on the service provider system 1200. In implementations, the one or more VPN clients 1, 2, . . . , N 1120 may be integrated into the switch VPN application 1110. Consequently, the APIs 1115 and/or the task manager may not be needed to invoke the VPN client.

The application process manager 1130 is connected to the switch VPN application 1110 via an API. The application process manager 1130 may be a PowerShell scripting program which assists the switch VPN application 1110 to detect when a VPN requiring connectable entity is opened or invoked, start execution of an associated VPN client, and send credentials stored with respect to the associated VPN client.

The task manager 1140 may be used to interface or interact with the VPN requiring connectable entities in the event APIs such as the APIs 1113 are not provisioned for interfacing with the VPN requiring connectable entities.

The service provider system 1200 may include one or more networks such network 1 1210, network 2 1220 and network 3 1230 which maintain different computer resources which require VPN connections (referred herein as the "connectable entities"). For example, the network 1 1210 may include a server A 1212 and an application A 1214 which may be accessed by establishing a connection via VPN 1216 using one of the one or more VPN clients 1, 2, . . . , N 1120. For example, the network 2 1220 may include a server B 1222 which may be accessed by establishing a connection via VPN 1224 using one of the one or more VPN clients 1, 2, . . . , N 1120. For example, the network 3 1230 may include a server C 1232 and a software A 1234 which may be accessed by establishing a connection via VPN 1236 using one of the one or more VPN clients 1, 2, . . . , N 1120.

The network 1150 may be and may include, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, an IP network, and like including any combinations thereof. In an implementation, the network 1150 may contain one or more servers, network elements or devices, and the like.

Figure 2:
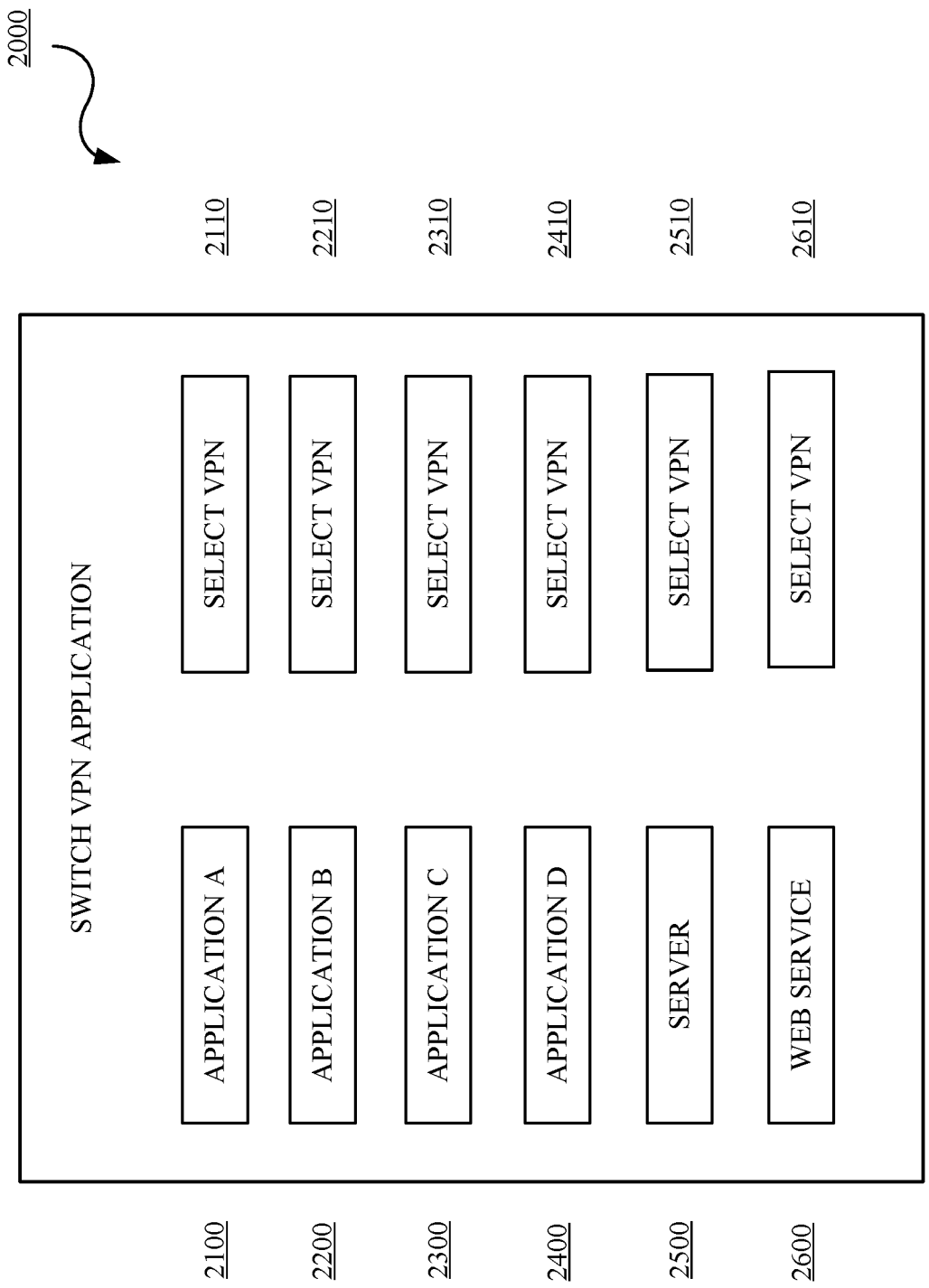
FIG. 2 is a diagram of an example interface for configuring a switch VPN application in accordance with embodiments of this disclosure.
Figure 3:
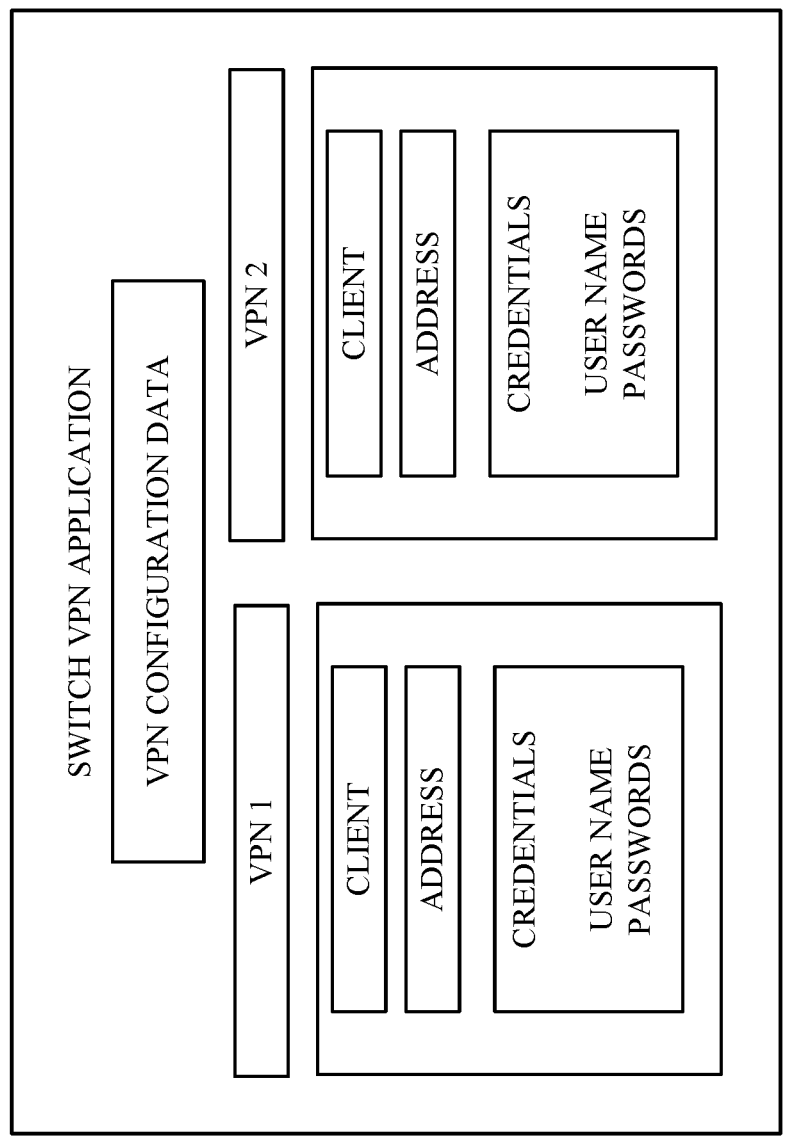
FIG. 3 is a diagram of example VPN configuration page in a switch VPN application in accordance with embodiments of this disclosure.

Operationally, a user defines in the switch VPN application 1110 a list of connectable entities and associated VPNs. FIG. 2 is a diagram of an example interface 2000 for configuring the switch VPN application 1110 in accordance with embodiments of this disclosure. The interface 2000 permits the user to input each connectable entity, such as application A 2100, application B 2200, application C, 2300, application D 2400, server 2500, a Web service 2600, and other such computer resources or data, with a VPN, such as VPN 2110, 2210, 2310, 2410, 2510, and 2610. The interface 2000 permits the user to input configuration information as shown in FIG. 3, which is a diagram of example VPN configuration page 3000 in the switch VPN application 1110 in accordance with embodiments of this disclosure. The VPN configuration page 3000 permits user to input information for a VPN 3100 such as VPN client 3110, address 3120, and credentials 3130. The switch VPN application 1110 will link and maintain the user inputted information. The VPN configuration data enables the switch VPN application 1110 to invoke a VPN client, while running in the background, when a certain application is started to connect to the corresponding VPN. For example, the switch VPN application 1110 can use an API or shortcut link to open the VPN client and provide the applicable credentials.

As noted, the switch VPN application 1110 runs in the background. The application process manager 1130 and the switch VPN application 1110/application detection module 1112 can detect the opening of a connectable entity via the APIs 1113 or the task manager 1130. This can be done, for example, by executing a get process command to obtain and record a process ID of the connectable entity. The application process manager 1130 and the switch VPN application 1110 can, using for example a kill process command, close a previously opened VPN if the previously opened VPN and the VPN are different. The application detection module 1112 can instruct or invoke the VPN module 1114 to invoke a VPN client using the APIs 1115 or via the task manager 1140. This can be done, for example, by executing a start process command via the application process manager 1130, which opens an executable file associated with the stored configuration data. The VPN module 1114 can push the credentials to the VPN client using an application process manager script, for example, to establish the VPN connection.

In implementations, in addition to automatically disconnecting the previously running VPN, the switch VPN application 1110 can kill the previously running connectable entity. In implementations, the switch VPN application 1110 can alert the user with respect to continuing with the VPN switch, killing the previously running connectable entity, or combinations thereof. These inquiries are do not involve the user in the connection/disconnection process other than to confirm the automatic operations.

In implementations, the application process manager 1130 and the switch VPN application 1110 can detect or obtain the status or process activity of a connectable entity which has a VPN connection. In an example, this can be determined if the connectable entity process has been minimized (not in use) or maximized (in use). In an example, the application process manager 1130 can obtain information from the task manager 1140 to obtain a process status. If the status is inactive, the switch VPN application 1110 can automatically close the VPN connection. In implementations, the switch VPN application 1110 can automatically close the application. In implementations, a user alert can be provided to confirm or cancel either action.

In summary, each time a specific connectable entity is opened, the switch VPN application 1110 will automatically invoke the corresponding VPN without the user's intervention. Consequently, the switch VPN application 1110 can automatically disconnect a previously running VPN and connect to a linked VPN using the VPN client and defined configuration data.

Figure 4:
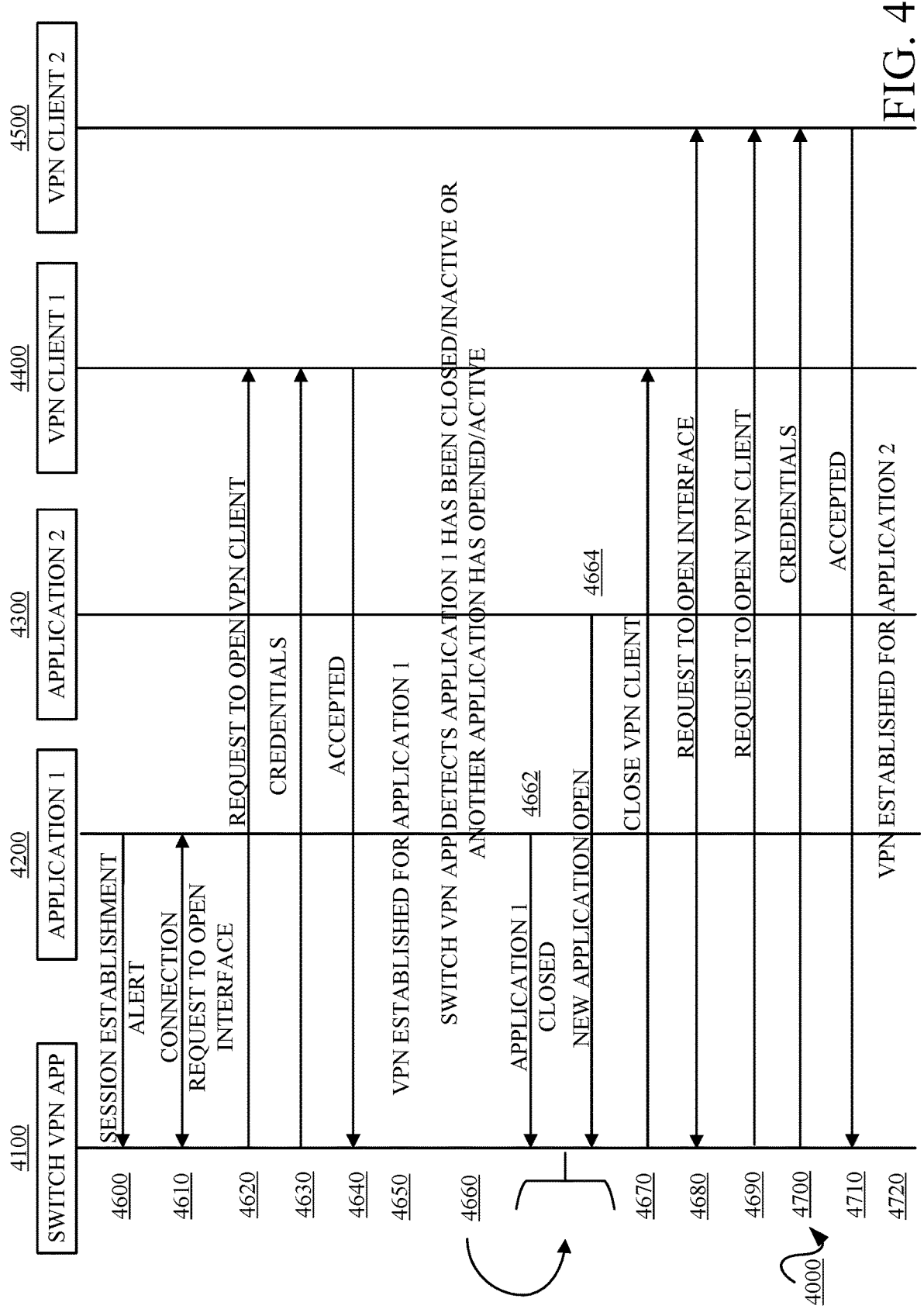
FIG. 4 is a diagram of an example flow for switching between VPNs in accordance with embodiments of this disclosure.

FIG. 4 is a diagram of an example flow 4000 for switching between VPNs in accordance with embodiments of this disclosure. The flow 4000 may be executed between a switch VPN application 4100, a software application 1 4200, a software application 2 4300, a VPN client 1 4400, and a VPN client 2 4500. The switch VPN application 4100 detects, obtains, or receives a session establishment alert when an application 1 4200 is initiated or started (4600). The switch VPN application 4100 and the application 1 4200 mutually request opening of an intent interface for internal process communication (4610). The switch VPN application 4100 sends a request to open the VPN client 1 4400, which is the VPN client associated with the application 1 4200 (4620). The switch VPN application 4100 sends or pushes the credentials for the VPN client 1 4400 to the VPN client 1 4400 (4630). The VPN client 1 4400 accepts the credentials (4640). A VPN connection is established for the application 1 4200 (4650). The VPN connection is done automatically upon detection.

The switch VPN application 4100 detects, obtains, or receives an alert associated with application activity (4600). In an example, an inactive session alert is received when the application 1 4300 is closed or minimized (4622). In an example, a session establishment alert is received when the application 2 4300 is initiated or started (4624). In either alert case, the switch VPN application 4100 can automatically close the VPN client 1 4400 VPN connection (4670).

In the event of detecting the opening of the application 2 4300 (4664), the switch VPN application 4100 and the application 2 4300 mutually request opening of an intent interface for internal process communication (4680). The switch VPN application 4100 sends a request to open the VPN client 2 4500, which is the VPN client associated with the application 2 4300 (4690). The switch VPN application 4100 sends or pushes the credentials for the VPN client 2 4500 to the VPN client 2 4500 (4700). The VPN client 2 4500 accepts the credentials (4710). A VPN connection is established for the application 2 4300 (4720). The VPN connection is done automatically upon detection.

Figure 5:
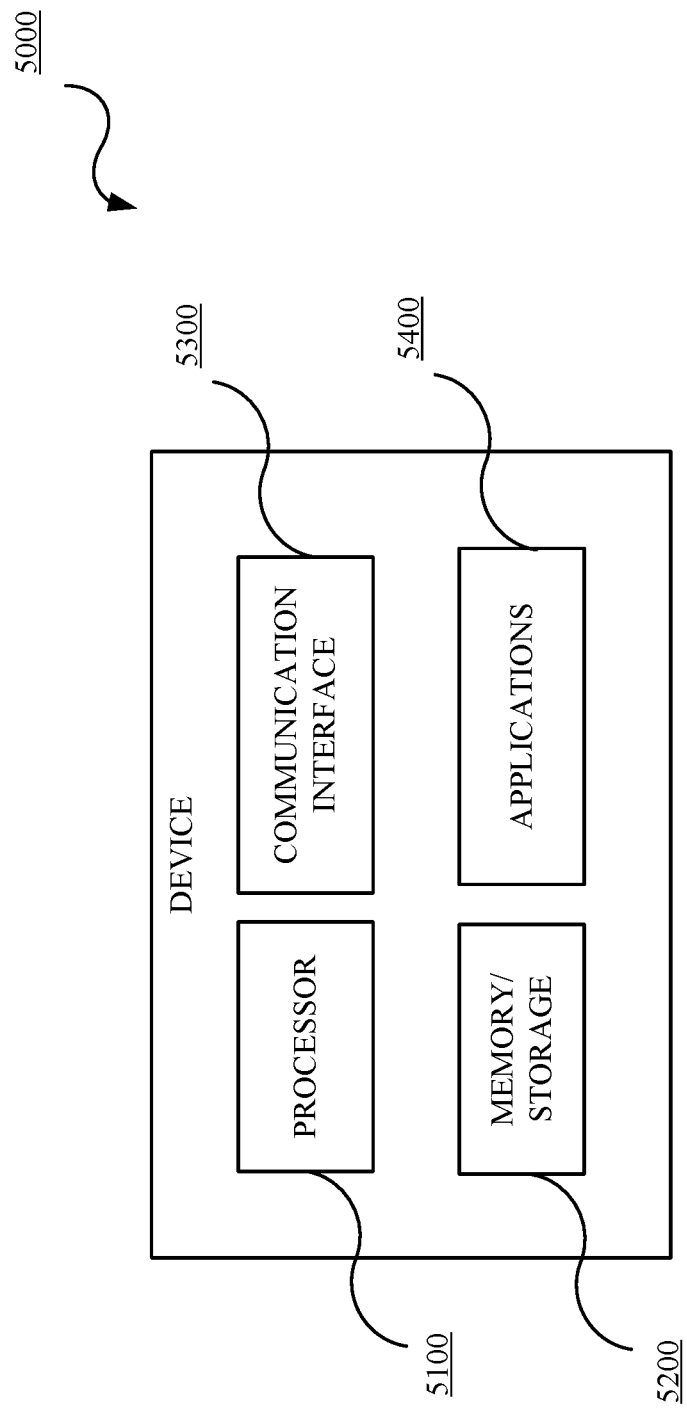
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. The device 5000 may include or implement, for example, the user device 1100 and elements of the service provider system 1200. In an implementation, the memory/storage 5200 may store data for the switch VPN application 1110 and related elements, the configuration data, and a list of the connectable entities and associated VPN. The applications 5400 can include the switch VPN application 1110 and the switch VPN application 4100. The applications 5400 and the techniques or methods described herein may be stored in the memory/storage 5200 and executed by the processor 5100 in cooperation with the memory/storage 5200, the communications interface 5300, and applications 5400, as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
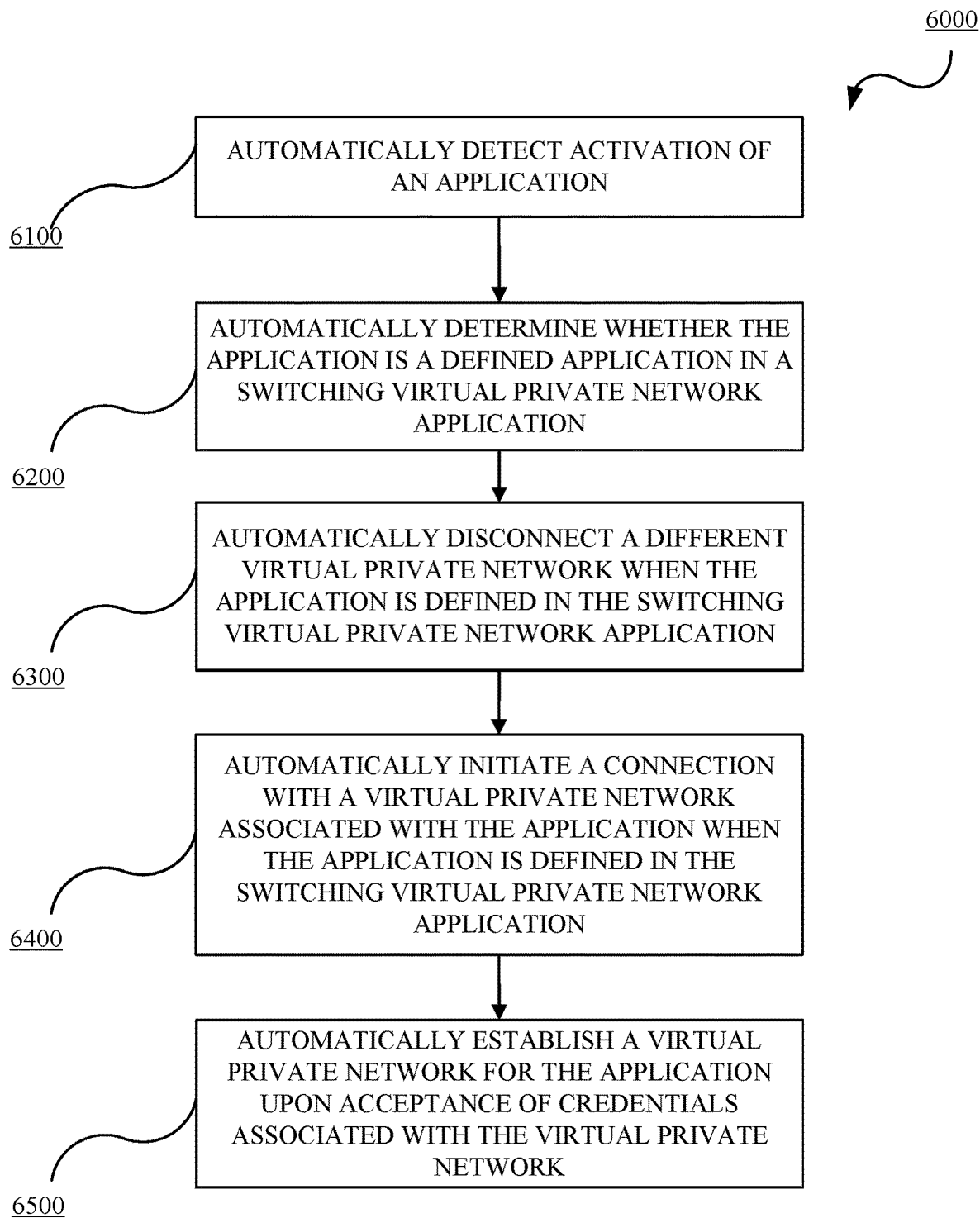
FIG. 6 is a flowchart of an example method for switching between VPNs in accordance with embodiments of this disclosure.

FIG. 6 is a flowchart of an example method 6000 for automatic VPN switching in accordance with embodiments of this disclosure. The method 6000 includes: automatically detecting 6100 activation of an application; automatically determining 6200 whether the application is a defined application in a switching virtual private network application; automatically disconnecting 6300 a different virtual private network when the application is defined in the switching virtual private network application; automatically initiating 6400 a connection with a virtual private network associated with the application when the application is defined in the switching virtual private network application; and automatically establishing 6500 a virtual private network for the application upon acceptance of credentials associated with the virtual private network. For example, the technique 6000 may be implemented, as applicable and appropriate, by the user device 1100, the service provider system 1200, the switch VPN application 1110, and the switch VPN application 4100.

The method 6000 includes automatically detecting 6100 activation of an application. A switching virtual private network application running in the background on a user device can detect when an application (a connectable entity) or process associated with the application is opened or has been initiated. An alert can be obtained via a task manager and application process manager.

The method 6000 includes automatically determining 6200 whether the application is a defined application in a switching virtual private network application. The switching virtual private network application is provisioned with a list of applications and associated VPNs.

The method 6000 includes automatically disconnecting 6300 a different virtual private network when the application is defined in the switching virtual private network application. The switching virtual private network application determines whether a VPN connection is already in place. If the existing VPN connection is different than the one needed for the detected application, the switching virtual private network application disconnects the existing VPN connection. In implementations, the application associated with the disconnected VPN connection can be closed.

The method 6000 includes automatically initiating 6400 a connection with a virtual private network associated with the application when the application is defined in the switching virtual private network application. The switching virtual private network application establishes an interface with the application for internal communications, requests or opens the VPN client associated with the required VPN, and pushes credentials to a VPN client. The switching virtual private network application can do this directly via APIs or via a task manager or similar construct.

The method 6000 includes automatically establishing 6500 a virtual private network for the application upon acceptance of credentials associated with the virtual private network. The switching virtual private network application can automatically disconnect an active VPN connection if the associated application is inactive or minimized. In implementations, the application can be closed.

Figure 7:
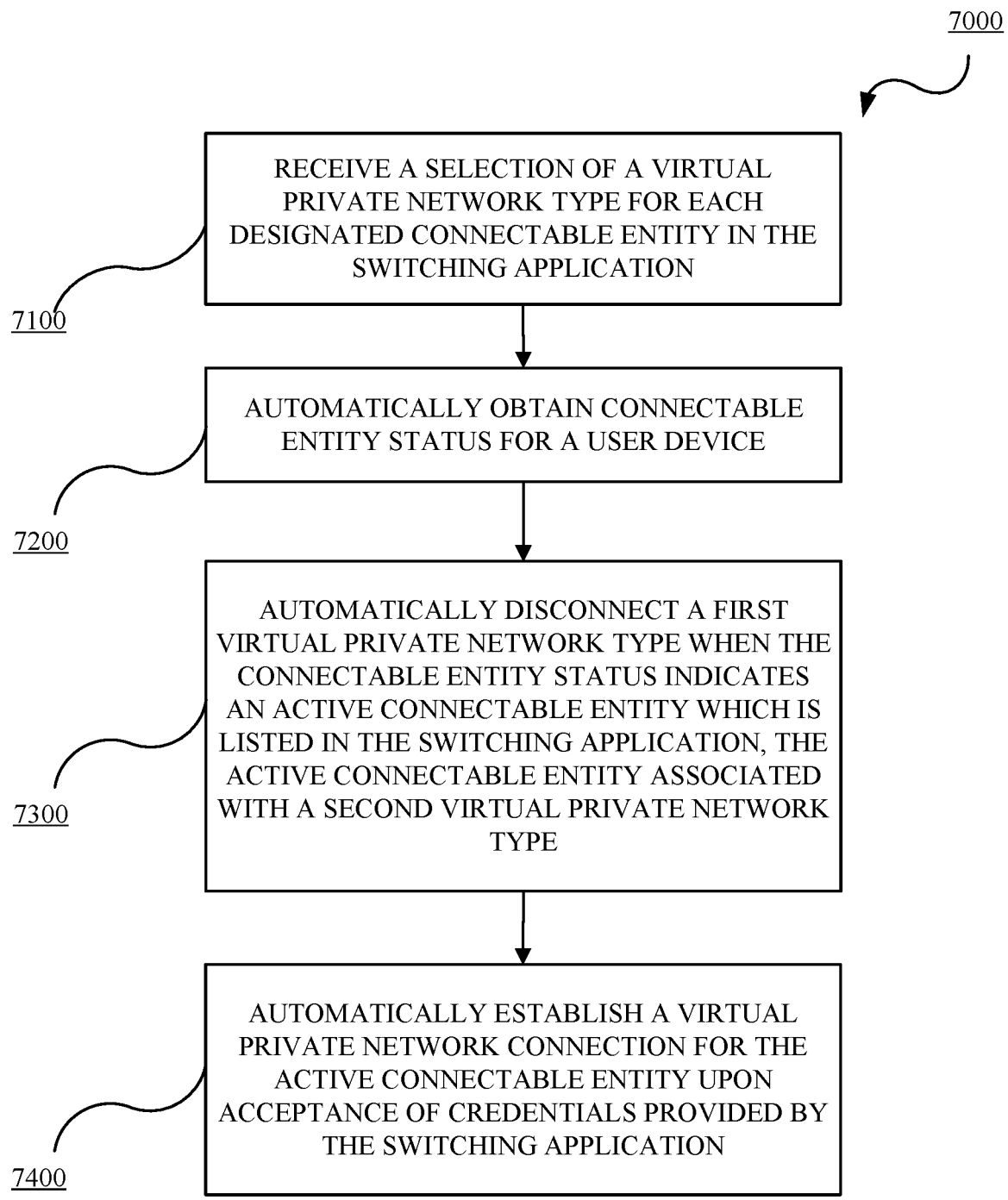
FIG. 7 is a flowchart of an example method for switching between VPNs in accordance with embodiments of this disclosure.

FIG. 7 is a flowchart of an example method 7000 for automatic VPN switching in accordance with embodiments of this disclosure. The method 7000 includes: receiving 7100 a selection of a virtual private network type for each designated connectable entity in the switching application; automatically obtaining 7200 connectable entity status for a user device; automatically disconnecting 7300 a first virtual private network type when the connectable entity status indicates an active connectable entity which is listed in the switching application, the active connectable entity associated with a second virtual private network type; and automatically 7400 establishing a virtual private network connection for the active connectable entity upon acceptance of credentials provided by the switching application. For example, the technique 7000 may be implemented, as applicable and appropriate, by the user device 1100, the service provider system 1200, the switch VPN application 1110, and the switch VPN application 4100.

The method 7000 includes receiving 7100 a selection of a virtual private network type for each designated connectable entity in the switching application. The switching virtual private network application is provisioned with a list of connectable entities and associated VPNs.

The method 7000 includes automatically obtaining 7200 connectable entity status for a user device. A switching virtual private network application running in the background on a user device can detect when a connectable entity or process associated with the connectable entity is opened or has been initiated. This includes receiving status of any applications with active VPN connections. An alert can be obtained via a task manager and application process manager.

The method 7000 includes automatically disconnecting 7300 a first virtual private network type when the connectable entity status indicates an active connectable entity which is listed in the switching application, the active connectable entity associated with a second virtual private network type. If the detected connectable entity is on the list and uses a different VPN than an existing VPN connection, the existing VPN is disconnected. In implementations, the application associated with the disconnected VPN connection can be closed.

The method 7000 includes automatically 7400 establishing a virtual private network connection for the active connectable entity upon acceptance of credentials provided by the switching application. The switching virtual private network application establishes an interface with the connectable entity for internal communications, requests or opens the VPN client associated with the required VPN, and pushes credentials to a VPN client. The switching virtual private network application can do this directly via APIs or via a task manager or similar construct. The switching virtual private network application can automatically disconnect an active VPN connection if the associated connectable entity is inactive or minimized. In implementations, the connectable entity can be closed.

The description herein describes methods and systems for automatically switching between virtual private networks. An example method for automatically switching between virtual private networks includes automatically detecting, by a switching virtual private network application, activation of an application, automatically determining, by the switching virtual private network application, whether the application is a defined application in the switching virtual private network application, wherein each defined application includes an associated virtual private network which is needed for a user device to access the application, automatically disconnecting, by the switching virtual private network application, a different virtual private network when the application is defined in the switching virtual private network application, automatically initiating, by the switching virtual private network application, a connection with a virtual private network associated with the application when the application is defined in the switching virtual private network application, and automatically establishing a virtual private network for the application upon acceptance of credentials associated with the virtual private network.

The automatically initiating further includes automatically sending, by the switching virtual private network application, a request to open a virtual private network client associated with the virtual private network, and automatically sending, by the switching virtual private network application, credentials associated with the virtual private network client. The automatically detecting further includes automatically receiving, by the switching virtual private network application, an activation alert via an application process manager. The automatically initiating includes automatically sending, by the switching virtual private network application to a task manager, a request to open a virtual private network client associated with the virtual private network, and automatically sending, by the switching virtual private network application to the task manager, credentials associated with the virtual private network client. The method further includes provisioning, the switching virtual private network application, with defined applications and associated virtual private networks. The method further includes automatically disconnecting, by the switching virtual private network application, a connected virtual private network when the application is inactive. The automatically disconnecting, by the switching virtual private network application, a connected virtual private network when the application is inactive further includes automatically closing, by the switching virtual private network application, the application. The automatically disconnecting, by the switching virtual private network application, a different virtual private network further includes automatically closing, by the switching virtual private network application, the application.

An example method for virtual private network switching includes receiving, by a switching application, a selection of a virtual private network type for each designated connectable entity in the switching application, automatically obtaining, by the switching application, connectable entity status for a user device, automatically disconnecting, by the switching application, a first virtual private network type when the connectable entity status indicates an active connectable entity which is listed in the switching application, the active connectable entity associated with a second virtual private network type, and automatically establishing a virtual private network connection for the active connectable entity upon acceptance of credentials provided by the switching application.

The automatically establishing further includes automatically requesting, by the switching application, to open a virtual private network client associated with the second virtual private network type, and automatically providing, by the switching application, credentials associated with the virtual private network client. The automatically establishing further includes automatically sending, by the switching application to a task manager, a request to open a virtual private network client associated with the second virtual private network type, and automatically sending, by the switching application to the task manager, credentials associated with the virtual private network client. The automatically receiving further includes receiving, the switching application, credentials for each virtual private network type for each designated connectable entity. The method further includes automatically disconnecting, by the switching application, a connected virtual private network type when the connectable entity status for an associated connectable entity is inactive. The automatically disconnecting, by the switching application, a connected virtual private network type when the connectable entity status for an associated connectable entity is inactive further includes automatically closing, by the switching application, the associated connectable entity. The automatically disconnecting, by the switching application, a first virtual private network further includes automatically closing, by the switching application, a connectable entity associated with the first virtual private network.

An example apparatus includes a memory configured to store a switching virtual private network application, and a processor configured to run the switching virtual private network application as a background operation, wherein the processor and the switching virtual private network application are configured to automatically detect activation of an application, automatically determine whether the application is a listed application with an associated virtual private network, automatically disconnect a different virtual private network when the application is listed, and automatically establish a virtual private network connection for the application using a virtual private network associated with the application upon credentials acceptance.

The processor and the switching virtual private network application are further configured to automatically request to open a virtual private network client associated with the virtual private network and automatically send the credentials associated with the virtual private network client. The processor and the switching virtual private network application are configured to receive a selection of a virtual private network for each application in a list of applications. The processor and the switching virtual private network application are configured to automatically disconnect a connected virtual private network when a corresponding application is inactive. The processor and the switching virtual private network application are configured to automatically send to a systems monitor a request to open a virtual private network client associated with the virtual private network and automatically send to the systems monitor the credentials associated with the virtual private network client.

Although some embodiments herein refer to methods, it will be appreciated by one skilled in the art that they may also be embodied as a system or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for automatically switching between virtual private networks, the method comprising:
   maintaining, by a switching virtual private network application, a user defined virtual private network (VPN) list which includes applications and associated virtual private networks for accessing each of the applications by a user device;
   automatically detecting, by the switching virtual private network application, activation of an application;
   automatically determining, by the switching virtual private network application, whether the application is on the VPN list in the switching virtual private network application;
   automatically disconnecting, by the switching virtual private network application, a an active virtual private network when the application is listed in the VPN list in the switching virtual private network application and is associated with another virtual private network;

automatically initiating, by the switching virtual private network application, a connection with the another virtual private network associated with the application when the application is defined in the switching virtual private network application; and automatically establishing the another virtual private network for the application upon acceptance of credentials associated with the another virtual private network.

2. The method of claim 1, wherein the automatically initiating further comprising:

automatically sending, by the switching virtual private network application, a request to open a virtual private network client associated with the another virtual private network; and automatically sending, by the switching virtual private network application, credentials associated with the another virtual private network client.

3. The method of claim 1, wherein the automatically detecting further comprising:

automatically receiving, by the switching virtual private network application, an activation alert via an application process manager.

4. The method of claim 1, wherein the automatically initiating further comprising:

automatically sending, by the switching virtual private network application to a task manager, a request to open a virtual private network client associated with the another virtual private network; and automatically sending, by the switching virtual private network application to the task manager, credentials associated with the another virtual private network client.

5. The method of claim 1, further comprising:

provisioning the switching virtual private network application with the VPN list including the applications and the associated virtual private networks.

6. The method of claim 1, further comprising:

automatically disconnecting, by the switching virtual private network application, the another virtual private network when the application is inactive.

7. The method of claim 6, wherein the automatically disconnecting, by the switching virtual private network application, the another virtual private network when the application is inactive further comprising:

automatically closing, by the switching virtual private network application, the application.

8. The method of claim 1, wherein the automatically disconnecting, by the switching virtual private network application, the virtual private network further comprising:

automatically closing, by the switching virtual private network application, an application associated with the virtual private network.

9. An apparatus comprising:

a memory configured to store a switching virtual private network application; and a processor configured to run the switching virtual private network application as a background operation, wherein the processor and the switching virtual private network application are configured to:

maintain a user defined virtual private network (VPN) list which includes applications and associated virtual private networks for accessing each of the applications by a user device;

automatically detect activation of an application;

automatically determine whether the application is a listed application on the VPN list;

automatically disconnect an active virtual private network when the application is listed and is associated with a different virtual private network; and automatically establish a virtual private network connection for the application using the different virtual private network associated with the application upon credentials acceptance.

10. The apparatus of claim 9, wherein the processor and the switching virtual private network application are configured to:

automatically request to open a virtual private network client associated with the different virtual private network; and automatically send the credentials associated with the virtual private network client.

11. The apparatus of claim 9, wherein the processor and the switching virtual private network application are configured to:

receive a selection of a virtual private network for each application in the VPN list.

12. The apparatus of claim 9, wherein the processor and the switching virtual private network application are configured to:

automatically disconnect a connected virtual private network when a corresponding application is inactive.

13. The apparatus of claim 9, wherein the processor and the switching virtual private network application are configured to:

automatically send to a system monitor a request to open a virtual private network client associated with the different virtual private network; and automatically send to the system monitor the credentials associated with the virtual private network client.

* * * * *